United States Patent [19]

Mihara

[11] Patent Number: 4,948,234
[45] Date of Patent: Aug. 14, 1990

[54] ZOOM LENS SYSTEM

[75] Inventor: Sinichi Mihara, Tokyo, Japan

[73] Assignee: Olympus Optical Co., Ltd., Tokyo, Japan

[21] Appl. No.: 437,163

[22] Filed: Nov. 16, 1989

[30] Foreign Application Priority Data

Nov. 18, 1988 [JP] Japan .................... 63-290051

[51] Int. Cl.$^5$ .................... G02B 15/15; G02B 9/64
[52] U.S. Cl. .................................... 350/423
[58] Field of Search ........................ 350/423, 427

[56] References Cited

U.S. PATENT DOCUMENTS 3,160,699 12/1964 Yamaji .
4,394,072 7/1983 Betensky .

FOREIGN PATENT DOCUMENTS 60-123817 7/1985 Japan .
62-27712 2/1987 Japan .
62-247318 10/1987 Japan .
63-169611 7/1988 Japan .

Primary Examiner—Bruce Y. Arnold
Assistant Examiner—Rebecca D. Gass
Attorney, Agent, or Firm—Cushman, Darby & Cushman

[57] ABSTRACT

A zoom lens system comprising, in the order from the object side, a first lens unit which has positive refractive power, a second lens unit which has negative refractive power and is movable along the optical axis for varying focal length, a third lens unit which has negative refractive power and is movable along the optical axis for varying focal length but in a locus different from that of the second lens unit, and a fourth lens unit which has positive refractive power and is always kept fixed, the first lens unit consisting of a negative meniscus lens element convex on the object side and a positive lens element, the second lens unit consisting only of a single negative meniscus lens element convex on the object side, and the third lens unit consisting of a negative lens element and a positive lens element. The zoom lens system comprises a small number of lens elements, has a compact design and features favorable imaging peformance, and the first lens unit thereof consists only two lens elements and has a small diameter.

8 Claims, 9 Drawing Sheets

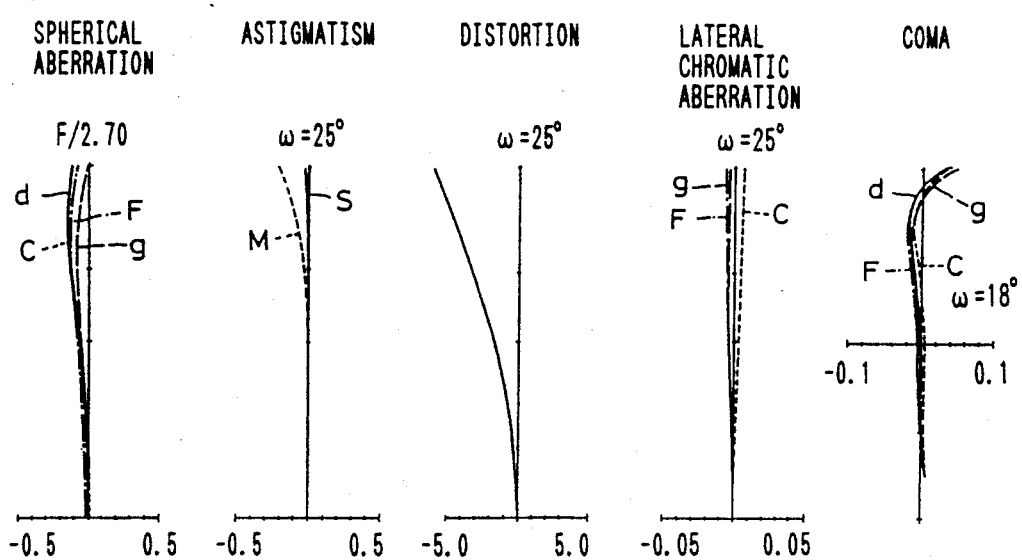
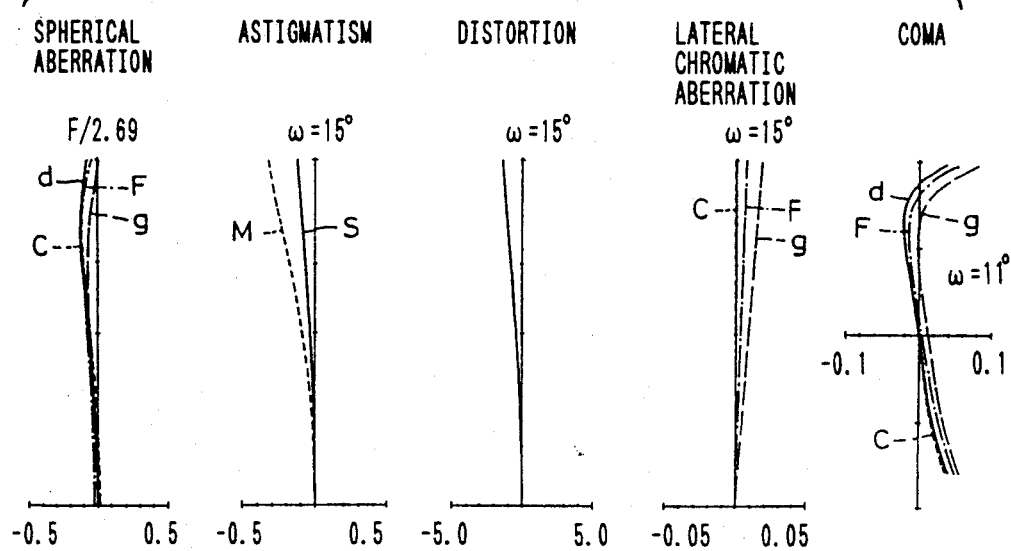

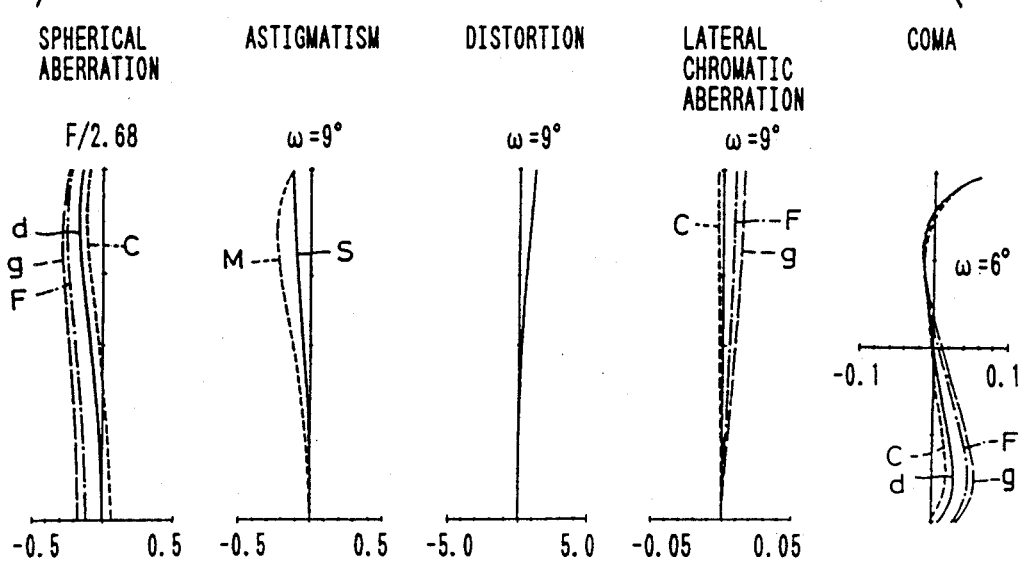
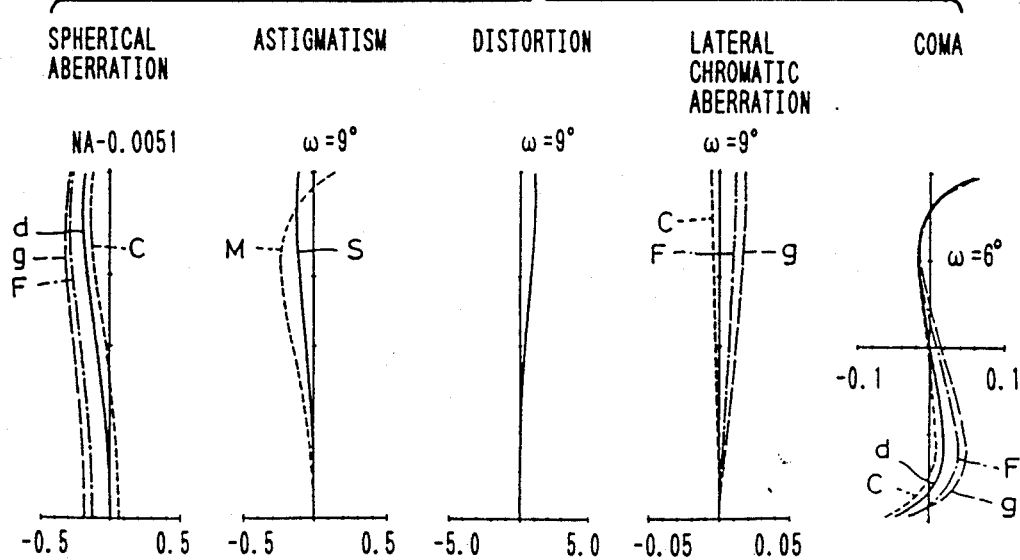

ZOOM LENS SYSTEM

BACKGROUND OF THE INVENTION (a) Field of the invention:

The present invention relates to a zoom lens system, and more specifically to a zoom lens system for use with cameras using electronic image pickup tubes or solid-state image pickup devices as the image sensors.

(b) Description of the prior art:

Most of the lens systems for use with cameras using electronic image pickup tubes or solid-state image pickup devices as the image sensors are designed as zoom lens systems. These zoom lens systems are mostly specified for aperature ratios of at least F/2.8 and zooming ratios of at least 3. Though these zoom lens systems have high aperture ratios and high vari-focal ratios, they comprise lens elements in numbers as large as 13 to 15 and require high manufacturing costs.

Recently, there are known zoom lens systems of this type comprising 12 to 18 lens elements as exemplified by the lens systems disclosed by Japanese Unexamined Published Patent Applications No. 123817/60 and No. 247318/62. Out of these zoom lens systems, the zoon lens system disclosed by Japanese Unexamined Published Patent Application No. 247318/62 has a fundamental composition consisting, in the order from the object side, of a first lens unit which has positive refractive power, and is kept fixed for varying focal length but movable for focusing, a second lens unit which has negative refractive power and is movable for varying forcal length, a third lens unit which has positive refractive power and is moved along a locus convex on the image side for correcting the position of image surface deviated by varying focal length, and a fourth lens unit which has an imaging function and is always kept fixed. This zoom lens system comprises three lens elements in the first lens unit, three lens elements in the second lens unit, one lens element in the third lens unit and four lens elements in the fourth lens unit, i.e. 11 lens elements in total, and is one of the zoom lens systems currently known as those comprising small numbers of lens elements.

In these days, there is a trend to design video movie cameras and still video cameras which are compacter in external dimensions, lighter in weights and manufacturable at lower costs. Conventionally, photographic lens systems for use with these cameras were designed mostly for zooming ratio on the order of 6, aperture ratios on the order of F/1.4 and field angles on the order of 50° at the wide position. However, these photographic lens systems are recently being replaced with zoom lens systems designed for lower specifications of zooming ratios of 2 to 3 and aperture ratios on the order of F/2.0 to F/2.8. When the specifications are lowered as described above, it is easy to obtain zoom lens systems which are compact in external dimensions, light in weight and manufacturable at low costs. However, there has been obtained no zoom lens system yet which is compact in external dimensions, light in weight and manufacturable at a low cost sufficiently paying the lowering of the specifications.

The zoom lens system disclosed by Japanese Unexamined Published Patent Application No. 169611/63, for example, requires a high manufacturing cost due to the large diameter thereof, comprises three lens elements in the first lens unit thereof a consists of 10 lens elements in total. However, this zoom lens system has a long distance as measured from the first surface to the final surface thereof, and is not designed for reserving a back focal length sufficient for allowing to arrange a splitting mirror for a viewfinder and a optical low pass filter for preventing moire after the lens system. Furthermore, this zoom lens system has Petzval's sum of a negative value, produces remarkable flare due to coma, hardly allows to reserve sufficient thickness at the marginal portions of the lens elements, and has a tendency to make intensity of marginal rays insufficient.

In addition, this conventional example of zoom lens system has a field angle of 45° at the wide position, a vari-focal ratio of 3 and aperture ratios of F/1.6 to F/2.1.

SUMMARY OF THE INVENTION

A primary object of the present invention is to provide a compact and light-weight zoom lens system which is manufacturable at a low cost, designed for a vari-focal ratio of 3, an aperture ratio of F/2 and favorable imaging performance, and consists of nine to ten lens elements in total including two lens elements composing the first lens unit thereof.

Another object of the present invention is to provide a zoom lens system which comprises lens elements in a total number reduced by using an aspherical surface in the fourth lens unit thereof so as to compose said lens unit of three lens elements.

The zoom lens system according to the present invention comprises, in the order from the object side, a first lens unit having positive refractive power, a second lens unit which has negative refractive power, and is moved along the optical axis for varying focal length, a third lens unit which has negative refractive power and is moved, for varying focal length, along the optical axis but in a locus different from that of the second lens unit, and a fourth lens unit which has positive refractive power and is always kept fixed. Further, the first lens unit consists only of two lens elements, i.e., a negative meniscus lens element having a convex surface on the object side and a positive lens element, the second lens unit consists of a single meniscus lens element having a convex surface on the object side, and the third lens unit consists of a positive lens element and a negative lens element or a cemented lens component composed of these two lens element cemented to each other. The zoom lens system according to the present invention is so designed as to satisfy the following conditions (1) and (2):

$$1.0 < (r_{21} + (r_{22})/(r_{21} - r_{22}) < 2.5 \quad (1)$$

$$f_W^{0.36} \cdot f_T^{0.64} < f_E < f_W^{0.1} \cdot f_T^{0.9} \quad (2)$$

wherein the reference symbols $r_{21}$ and $r_{22}$ represent radii of curvature on the object side surface and the image side surface repectively of the second lens unit, the reference symbol $f_E$ designates focal length of the zoom lens system as a whole in a condition where total magnification of the second lens unit and the third lens unit is set at 1, and the reference symbols $f_W$ and $f_T$ denote focal lengths of the zoom lens system as a whole at the wide position and the tele position respectively.

The conventional zoom lens system described above is designed for the lowered specifications, i.e., the zooming ratio of 2 to 3 and F number of 2.0 to 2.8, but is not sufficiently compact in external dimensions, light in weight and manufacturable at a low cost nor has sufficiently favorable imaging performance due to the fact that the first lens unit thereof consists of three lens elements. Generally speaking, lens systems comprising larger numbers of lens elements have more favorable imaging performance and can be made more compact more easily. In zoom lens systems comprising larger numbers of lens elements, however, spaces for allowing movements of lens units for varying focal length, etc. are narrowed and the movable lens units have stronger powers for reserving required vari-focal ratios.

Since the first lens unit comprises lens elements which are large in diameters and thick for reserving required thickness at the margins thereof, space for allowing movement of the first lens unit in apt to be restricted. Further, since the entrance pupil of the zoom lens system is apt to be located far from the first lens unit in the direction toward the image side, diameters of the lens elements must be further enlarged for reserving a sufficiently thick offaxial ray bundle and the lens elements are further thickened for reserving required thickness at the margins. Accordingly, the space for allowing movement of the lens units movable for variation of focal length is further restricted. When diameters of the lens elements are not enlarged, quantity of the marginal rays will undesirably be insufficient.

In a lens system such as the zoom lens system according to the present invention wherein the second lens unit and the third lens unit have a strongly negative total refractive power, and the entrance pupil must be located as close as possible to the first lens unit, the second lens unit is apt to have a concave surface on the object side thereof. Accordingly, a wide space must be reserved between the first lens unit and the second lens unit for avoiding interference between these lens units, thereby posing problems of aggravation of offaxial aberrations and so on. Further, since the total power of the second lens unit and the third lens unit is strong, Petzval's sum is apt to have a large negative value and the offaxial aberrations such as astigmatism are apt to be remarkable accordingly. For the reasons described above, it is desirable to design the second lens unit as a negative meniscus lens element having a convex surface on the object side. The condition (1) has been adopted for such a design of the second lens unit.

If the lower limit of the condition (1) is exceeded, the object side surface of the second lens unit will undesirably have a surface which is nearly concave. If the upper limit of the condition (1) is exceeded, in contrast, refractive power of the second lens unit will be weakened, thereby making it impossible to obtain a sufficiently high vari-focal ratio.

Now, description will be made on the movements of the second lens unit and the third lens unit for varying focal length.

The second lens unit and the third lens unit are moved for varying focal length and keeping the image point unchanged by varying focal length. In the zoom lens system according to the present invention wherein both of these lens units have negative refractive powers, the third lens unit is located at an extremely image side position when imaging magnification of the second lens unit is set at 1, and these lens units are located at the positions closest to each other when total imaging magnification of the second lens unit and the third lens unit is set in the vicinity of 1. When total imaging magnification of the second lens unit and the third lens unit is 1 or lower at the tele position, it is possible to move these lens units so as to be close to each other at the tele position. It is therefore possible to shorten the sum of the moving spaces included in the section from the second lens unit to the fourth lens unit and design a compact zoom lens system by selecting a magnification for the second lens unit at the wide position which is larger than the inverse number of the magnification at the tele position. In such a case, however moving locus of the second lens unit will be remarkably different from that of the third lens unit.

The zoom lens system according to the present invention is characterized in that it comprises lens elements in a number reduced by moving the second lens unit and the third lens unit in the same direction within a range as broad as possible. In order to move the second lens unit and the third lens unit in the same direction within a range as broad as possible, it is desirable to design the lens system in such a manner that total magnification of the second lens unit and the third lens unit is set at 1 when focal length of the zoom lens system as a whole becomes equal to the geometrical mean of the focal length at the wide position and the focal length at the tele position. This design makes it possible to reduce variations of chromatic aberration, etc. to be caused by varying focal length with a small number of lens elements.

In order to obtain a zoom lens system which is shortened in total length thereof, made compact by reducing diameter of the front lens element while reserving required quantity of marginal rays, and so adapted as to allow little variations of aberrations to be caused by varying focal length, it is preferable that focal length of the zoom lens system as a whole satisfies the condition (2) when total magnification of the second lens unit and the third lens unit is set at 1.

If the upper limit of the condition (2) is exceeded, an advantage will be obtained for designing a compact zoom lens system, but the second lens unit will tend to have strong power, and chromatic aberration and other aberrations will be varied remarkably by varying focal length. If the lower limit of the condition (2) is exceeded, in contrast, inconvenience will be produced for designing a compact zoom lens system.

In order to design the zoom lens system according to the present invention so as to have more favorably corrected aberrations and smaller dimensions, it is necessary to select an adequate design for the fourth lens unit used as the relay lens system. In order to obtain the fourth lens unit consisting of a smaller number of lens elements, it is necessary to compose the lens unit of three or four lens elements. However, when the fourth lens unit is composed in the order from the object side, of a positive lens element having curvature higher on the image side surface thereof, a positive lens element having curvature higher on the object side surface thereof, a negative lens element and a positive lens element as in the zoom lens system disclosed by Japanese Unexamined Published Patent Application No. 169611/63, it is difficult to reserve the required back focal length. When an attempt is made to prolong back focal length with the composition of the fourth lens unit described above, Petzval's sum will tend to have a negative value due to strengthened power of the negative lens element and flare due to coma of high orders will tend to be produced. Further, power of the positive lens element arranged on the extremely image side must be strengthened to locate the exit pupil farther from the first surface of the zoom lens system (to bring the exit pupil nearer the image surface).

The zoom lens system according to the present invention is based on a fundamental composition where the fourth lens unit consists of a four lens elements in total, i.e., a biconvex lens element having curvature higher on the object side surface thereof, a biconcave lens element and two positive lens elements which are arranged in the order from the object side. Further, in order to correct the flare due to coma, etc. more favorably, it is desirable to divide the biconcave lens element into two negative lens elements having weak powers or to use an aspherical surface on either of the two positive lens elements arranged on the image side of the biconcave lens element. Furthermore, it is possible to use a single positive lens element having strong power in place of these two positive lens elements and use an aspherical surface on the positive lens element so as to correct the aberrations produced by this positive lens element.

Since the zoom lens system according to the present invention has a field angle of approximately 50° at the wide position and a zooming ratio of at least 3, it is unnecessary to compose the first lens unit of three lens elements. In the zoom lens system according to the present invention, the first lens unit is composed of a negative meniscus lens element having a convex surface on the object side and a positive lens element arranged in the order from the object side.

When the first lens unit is composed of the two lens elements, the positive lens element has strengthened refractive power, thereby making it rather hard to reserve required thickness at the marginal portion thereof. However, when the first lens unit is composed of the two lens elements, the distance as measured from the vertex of the extremely object side surface to the vertex of the extremely image side surface is shortened. Owing to this fact, it is possible to locate the entrance pupil at a position closer to the first surface, shorten diameter of the front lens element and reserve the required thickness at the marginal portion thereof.

Inversely, the negative lens element arranged in the first lens unit is apt to have weakened power and correct chromatic aberration insufficiently, contrary to the purpose of use thereof. In order to correct this chromatic aberration, it is desirable to select a difference between Abbe's number $v_{I-1}$ of the negative lens element and Abbe's number $V_{I-2}$ of the positive lens element arranged in the first lens unit within the range defined by the following condition:

$$V_{I-2} - V_{I-1} > 20 \tag{3}$$

Further, in order to facilitate obtaining required thickness at the marginal portion of the positive lens element arranged in the first lens unit, it is preferable to select refractive index $n_{I-2}$ of this lens element within the range defined by the following condition:

$$n_{I-2} > 1.6 \tag{4}$$

Furthermore, in order to correct chromatic aberration more favorably and reserve required thickness of the positive lens element, it is desirable to determine relationship between total focal length $fI$ or the first lens unit and focal length $fI - 1$ of the negative lens element arranged in the first lens unit as defined by the following condition:

$$0.25 < f_I/|f_{I-1}| < 0.7 \tag{5}$$

If the lower limit of 0.25 of this condition is exceeded, it will be rather hard to correct the chromatic aberration. If the upper limit of 0.7 of this condition is exceeded, in contrast, the positive lens element arranged in the first lens unit will tend to have strengthened power, thereby making it rather hard to reserve required thickness at the marginal portion thereof. If the refractive power of the positive lens element is not strengthened in this case, total length of the zoom lens system as a whole will be prolonged and diameter of the front lens element will tend to be enlarged.

Moreover, the first lens unit is so designed as to be moved toward the object side, i.e., has a function for focusing. When the first lens unit is moved toward the object side for focusing the zoom lens system on an object located at a short distance, the entrance pupil is located far from the first surface and the offaxial rays are apt to be eclipsed. In addition aberrations such as spherical aberration and astigmatism are varied by moving the first lens unit, and it is necessary to minimize these variations as little as possible.

Speaking of these variations of aberrations, problems are posed especially by spherical aberration and astigmatism at the tele position. In the zoom lens system having a zooming ratio of 3, like that according to the present invention, the axial marginal ray passes through as relatively central portion of the first lens unit and spherical aberration is varied little. However, the offaxial ray passes through a relatively marginal portion of the first lens unit. Moreover, the first lens unit composed of the two lens elements has refractive power a little weaker than that of the first lens unit composed of three lens elements and must be moved for a longer distance for focusing. For the reasons described above, angle of incidence of the offaxial ray on the image side surface of the negative meniscus lens element having relatively high curvature is varied remarkably by focusing, thereby varying astigmatism.

Angle of incidence I2 of the outermost principal ray coming from an object located at infinite distance and falling on said negative meniscus lens element at the tele position is expressed approximately by the following formula:

$$I_2 = sin^{-1} \{(\overline{EP}_T - d_1) . tan \,\omega_T/r_2\} - \omega_T$$

where in reference symbol $\omega_T$ represents the maximum half field angle of the zoom lens system when it is focused on an object located at infinite distance, the reference symbol $\overline{EP}_T$ designates distance as measured from the first surface to the entrance pupil when the zoom lens system is focused on an object located at infinite distance at the tele position, the reference symbol d1 denotes thickness of the negative meniscus lens element arranged in the first lens unit, and the reference symbol r2 represents radius of curvature on the image side surface of the negative meniscus lens element.

Height of incidence $(\overline{EP}_T - d_1) \tan \omega_T$ of the principal ray increases nearly in proportion to moving distance of the first lens unit. Accordingly, the angle I2 is varied more largely as it has a larger value before the first lens unit is moved. Further the angle I2 is varied more largely as the radius of curvature r2 is shorter. For these reasons, it is desirable to design the zoom lens system according to the present invention so as to satisfy the following conditions (6), (7) and (8). In addition, the angle $I_2$ should desirably be small when the radius of curvature $r_2$ is short.

$$|I_2| < 35° \qquad (6)$$

$$0.9 < r_2/\sqrt{f_W \cdot f_T} < 2.0 \qquad (7)$$

$$0.35 < \Sigma D_1/\sqrt{f_W \cdot f_T} < 0.8 \qquad (8)$$

wherein the reference symbol $\Sigma D1$ represents distance as measured from the extremely object side surface to the extremely image side surface of the first lens unit.

If $|I_2|$ exceeds the upper limit of 35° of the condition (6), astigmatism will tend to be varied largely by focusing the zoom lens system.

If the lower limit of 0.9 of the condition (7) is exceeded, astigmatism will tend to be varied remarkably. If the upper limit of 2.0 of the condition (7) is exceeded, spherical aberration will tend to be undercorrected even when the zoom lens system is focused on an object located at infinite distance.

The condition (8) defines distance as measured from the extremely object side surface to the extremely image side surface of the first lens unit. The distance $\Sigma/D_1$ is closely related to the distance EPT as measured from the first surface to the entrance pupil. In other words, as the distance $\Sigma D_1$ becomes longer, the distance EPT is prolonged and diameter of the front lens element is apt to be enlarged. When an attempt is made to shorten the distance EPT forcibly, however, the radius of curvature $r_2$ will be shortened and the angle $|I_2|$ will tend to be enlarged. Accordingly, it is preferable to suppress variations of aberrations to be caused by focusing even if the distance $\overline{EPHD}$ r is somewhat prolonged.

If the distance $\Sigma/D_1$ is prolonged to exceed the upper limit of 0.8 of the condition (8), diameter of the front lens element will tend to be enlarged. If the lower limit of 0.35 of the condition (8) is exceeded, in contrast, it will be difficult to reserve required thickness at the marginal portion of the positive lens element arranged in the first lens unit.

As is understood from the foregoing description, the present invention has succeeded in obtaining a zoom lens system comprising lens elements in a number remarkably reduced, as compared with that of the lens elements used in the conventional zoom lens system which comprises 8 to 9 lens elements in the section from the first lens unit to the so-called erector, by composing the first through the third lens units only of five lens elements. Further, the zoom lens system according to the present invention comprises a front lens element having a small diameter.

BRIEF DESCRIPTION OF THE DRAWINGS

FIG. 4 through FIG. 7 show graphs illustrating aberration characteristics of the Embodiment 1 of the present invention;

DETAILED DESCRIPTION OF THE PREFERRED EMBODIMENTS

Figure 1A:
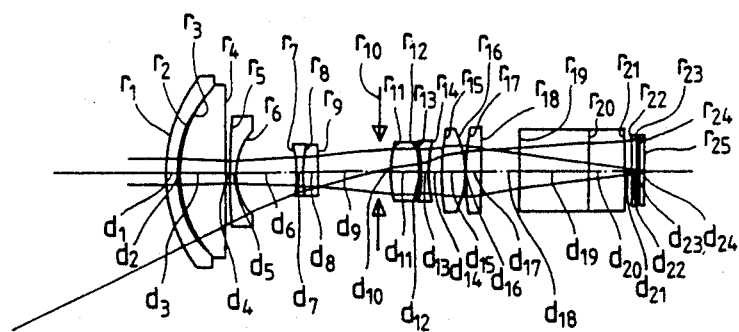
FIG. 1 through FIG. 3 show sectional views illustrating compositions of Embodiments 1 through 3 of the zoom lens system according to the present invention.

Now, the present invention will be described more detailedly below with reference to the preferred Embodiments illustrated in the accompanying drawings and given in the form of the following numerical data:

$f = 9 \sim 27$ mm, F/2.8, $2\omega = 50° \sim 18°$

Embodiment 1
$r_1 = 20.3488$
$d_1 = 1.5000 \quad n_1 = 1.84666 \quad v_1 = 23.78$
$r_2 = 15.2153$
$d_2 = 0.6000$
$r_3 = 16.5000$
$d_3 = 6.0000 \quad n_2 = 1.69680 \quad v_2 = 55.52$
$r_4 = \infty$
$d_4 = D_1$ (variable)
$r_5 = 83.9854$
$d_5 = 0.9000 \quad n_3 = 1.69680 \quad v_3 = 55.52$
$r_6 = 8.8284$
$d_6 = D_2$ (variable)
$r_7 = -16.1232$
$d_7 = 0.9000 \quad n_4 = 1.69680 \quad v_4 = 55.52$
$r_8 = 10.1226$
$d_8 = 2.0000 \quad n_5 = 1.84666 \quad v_5 = 23.78$
$r_9 = \infty$
$d_9 = D_3$ (variable)
$r_{10} = \infty$ (stop)
$d_{10} = 1.5000$
$r_{11} = 11.0781$
$d_{11} = 3.9103 \quad n_6 = 1.76200 \quad v_6 = 40.10$
$r_{12} = -18.7014$
$d_{12} = 0.2100$
$r_{13} = -11.4039$
$d_{13} = 1.0000 \quad n_7 = 1.84666 \quad v_7 = 23.78$
$r_{14} = 11.4039$
$d_{14} = 1.8261$
$r_{15} = 29.9355$
$d_{15} = 3.2000 \quad n_8 = 1.77250 \quad v_8 = 49.66$
$r_{16} = -12.0531$
$d_{16} = 0.1500$
$r_{17} = 46.8792$
$d_{17} = 2.2000 \quad n_9 = 1.69680 \quad v_9 = 55.52$
$r_{18} = -60.6872$
$d_{18} = 4.9500$
$r_{19} = \infty$
$d_{19} = 9.1000 \quad n_{10} = 1.51633 \quad v_{10} = 64.15$
$r_{20} = \infty$
$d_{20} = 5.1000 \quad n_{11} = 1.54771 \quad v_{11} = 62.83$
$r_{21} = \infty$
$d_{21} = 0.9000$
$r_{22} = \infty$
$d_{22} = 0.7000 \quad n_{12} = 1.51633 \quad v_{12} = 64.15$
$r_{23} = \infty$
$d_{23} = 0.3100$
$r_{24} = \infty$
$d_{24} = 0.6000 \quad n_{13} = 1.48749 \quad v_{13} = 70.20$
$r_{25} = \infty$

| f | 9 | 15.6 | 27 |
|---|---|------|-----|
| $D_1$ | 0.600 | 6.932 | 12.090 |
| $D_2$ | 8.079 | 3.000 | 3.500 |
| $D_3$ | 8.211 | 6.958 | 1.300 |

$(r_{21} + r_{22})/(r_{21} - r_{22}) = 1.235$, $f_E = 19.23$
$f_W^{0.36} \cdot f_T^{0.64} = 18.02$, $f_W^{0.1} \cdot f_T^{0.9} = 23.61$
$v_{I-2} - v_{I-1} = 31.74$, $n_{I-2} = 1.6968$
$f_I/|f_{I-1}| = 0.420$, $I_2° = 26.557°$ $r_2/\sqrt{f_W \cdot f_T} = 0.977$, $\Sigma D_1/\sqrt{f_W \cdot f_T} = 0.520$
Petzval's sum 0.002912

Embodiment 2
$r_1 = 20.6720$
$d_1 = 1.5000 \quad n_1 = 1.84666 \quad v_1 = 23.78$
$r_2 = 15.3349$
$d_2 = 0.5500$
$r_3 = 16.5000$
$d_3 = 6.0000 \quad n_2 = 1.69680 \quad v_2 = 55.52$ -continued f = 9~27 mm, F/2.8, 2ω = 50°~18°

| | | |
|---|---|---|
| r₄ = ∞ | | |
| d₄ = D₁ (variable) | | |
| r₅ = 116.0978 | | |
| d₅ = 0.9000 | n₃ = 1.69680 | v₃ = 55.52 |
| r₆ = 9.2964 | | |
| d₆ = D₂ (variable) | | |
| r₇ = 17.4712 | | |
| d₇ = 0.9000 | n₄ = 1.69680 | v₄ 55.52 |
| r₈ = 13.6071 | | |
| d₈ = 1.6000 | n₅ = 1.84666 | v₅ = 23.78 |
| r₉ = ∞ | | |
| d]= D₃ (variable) | | |
| r₁₀ = ∞ (stop) | | |
| d₁₀ = 1.5000 | | |
| r₁₁ = 9.4296 | | |
| d₁₁ = 6.1151 | n₆ = 1.77250 | v₆ = 49.66 |
| r₁₂ = −14.5653 | | |
| d₁₂ = 0.2200 | | |
| r₁₃ = −10.9767 | | |
| d₁₃ = 0.9000 | n₇ = 1.84666 | v₇ = 23.78 |
| r₁₄ = 11.6146 | | |
| d₁₄ = 1.0000 | | |
| r₁₅ = 11.2918 | | |
| d₁₅ = 3.2000 | n₈ = 1.74950 | v₈ = 35.27 |
| r₁₆ = −16.3413 (aspherical surface) | | |
| d₁₆ = 1.0000 | | |
| r₁₇ = ∞ | | |
| d₁₇ = 9.1000 | n₉ = 1.51633 | v₉ = 64.15 |
| r₁₈ = ∞ | | |
| d₁₈ = 5.1000 | n₁₀ = 1.54771 | v₁₀ = 62.83 |
| r₁₉ = ∞ | | |
| d₁₉ = 0.9000 | | |
| r₂₀ = ∞ | | |
| d₂₀ = 0.7000 | n₁₁ = 1.51633 | v₁₁ = 64.15 |
| r₂₁ = ∞ | | |
| d₂₁ = 0.3100 | | |
| r₂₂ = ∞ | | |
| d₂₂ = 0.6000 | n₁₂ = 1.48749 | v₁₂ = 70.20 |
| r₂₃ = ∞ | | |

| f | 9 | 15.6 | 27 |
|---|---|---|---|
| D₁ | 0.600 | 7.074 | 12.212 |
| D₂ | 8.097 | 3.000 | 3.500 |
| D₃ | 8.315 | 6.938 | 1.300 | aspherical surface coefficients $A_2 = 0$, $A_4 = 0.24822 \times 10^{-3}$
$A_6 = 0.13801 \times 10^{-4}$, $A_8 = -0.40685 \times 10^{-6}$, $P = 1$
$(r_{21} + r_{22})/(r_{21} - r_{22}) = 1.174$, $f_E = 19.25$
$f_W^{0.36} \cdot f_T^{0.64} = 18.02$, $f_W^{0.1} \cdot f_T^{0.9} = 23.61$
$v_{I-2} - v_{I-1} = 31.74$, $n_{I-2} = 1.6968$
$f_I/|f_{I-1}| = 0.433$, $I_2° = 25.893°$ $r_2/\sqrt{f_W \cdot f_T} = 0.984$, $\Sigma D_1/\sqrt{f_W \cdot f_T} = 0.517$
Petzval's sum 0.015640

Embodiment 3

| | | |
|---|---|---|
| r₁ = 20.5222 | | |
| d₁ = 1.5000 | n₁ = 1.84666 | v₁ = 23.78 |
| r₂ = 14.1866 | | |
| d₂ = 0.5000 | | |
| r₃ = 15.1032 | | |
| d₃ = 6.7000 | n₂ = 1.69680 | v₂ = 55.52 |
| r₄ = −211.4819 | | |
| d₄ = D₁ (variable) | | |
| r₅ = 542.1463 | | |
| d₅ = 0.9000 | n₃ = 1.69680 | v₃ = 55.52 |
| r₆ = 8.7016 | | |
| d₆ = D₂ (variable) | | |
| r₇ = −17.4260 | | |
| d₇ = 0.9000 | n₄ = 1.69680 | v₄ = 55.52 |
| r₈ = 9.3794 | | |
| d₈ = 1.8000 | n₅ = 1.84666 | v₅ = 23.78 |
| r₉ = 179.7364 | | |
| d₉ = D₃ (variable) | | |
| r₁₀ = ∞ (stop) | | |
| d₁₀ = 1.5000 | | |
| r₁₁ = 14.9978 | | |
| d₁₁ = 2.4000 | n₆ = 1.74950 | v₆ = 35.27 |
| r₁₂ = −19.1558 | | |
| d₁₂ = 0.4000 | | |

-continued f = 9~27 mm, F/2.8, 2ω = 50°~18°

| | | |
|---|---|---|
| r₁₃ = −10.7133 | | |
| d₁₃ = 1.0000 | n₇ = 1.84666 | v₇ = 23.78 |
| r₁₄ = −1239.6132 | | |
| d₁₄ = 1.0550 | | |
| r₁₅ = 800.7773 | | |
| d₁₅ = 1.0000 | n₈ = 1.84666 | v₈ = 23.78 |
| r₁₆ = −15.2438 | | |
| d₁₆ = 0.2700 | | |
| r₁₇ = 21.2668 | | |
| d₁₇ = 3.7000 | n₉ = 1.77250 | v₉ = 49.66 |
| r₁₈ = −12.2679 | | |
| d₁₈ = 0.1500 | | |
| r₁₉ = 43.6182 | | |
| d₁₉ = 1.9000 | n₁₀ = 1.69680 | v₁₀ = 55.52 |
| r₂₀ = −52.8744 | | |
| d₂₀ = 4.9500 | | |
| r₂₁ = ∞ | | |
| d₂₁ = 9.1000 | n₁₁ = 1.51633 | v₁₁ = 64.15 |
| r₂₂ = ∞ | | |
| d₂₂ = 5.1000 | n₁₂ = 1.54771 | v₁₂ = 62.83 |
| r₂₃ = ∞ | | |
| d₂₃ = 0.9000 | | |
| r₂₄ = ∞ | | |
| d₂₄ = 0.7000 | n₁₃ = 1.51633 | v₁₃ = 64.15 |
| r₂₅ = ∞ | | |
| d₂₅ = 0.3100 | | |
| r₂₆ = ∞ | | |
| d₂₆ = 0.6000 | n₁₄ = 1.48749 | v₁₄ = 70.20 |
| r₂₇ = ∞ | | |

| f | 9 | 15.6 | 27 |
|---|---|---|---|
| D₁ | 0.600 | 6.374 | 11.038 |
| D₂ | 7.766 | 3.000 | 3.500 |
| D₃ | 7.471 | 6.464 | 1.300 |

$(r_{21} + r_{22})/(r_{21} - r_{22}) = 1.033$, $f_E = 19.21$
$f_W^{0.36} \cdot f_T^{0.64} = 18.02$, $f_W^{0.1} \cdot f_T^{0.9} = 23.61$
$v_{I-2} - v_{I-1} = 31.74$, $n_{I-2} = 1.6968$
$f_I/|f_{I-1}| = 0.523$, $I_2° = 28.346°$ $r_2/\sqrt{f_W \cdot f_T} = 0.910$, $\Sigma D_1/\sqrt{f_W \cdot f_T} = 0.558$
Petzval's sum 0.003883 wherein the reference symbols $r_1, r_2 \ldots$ represent radii of curvature on the surface of the respective lens elements, the reference symbol d1 d2 ... designate thicknesses of the respective lens elements and airspaces reserved therebetween, the reference symbols $n_1, n_2 \ldots$ denote refractive indices of the respective lens elements, and the reference symbols $v_1, v_2 \ldots$ represent Abbe's numbers of the respective lens elements.

Figure 1B:
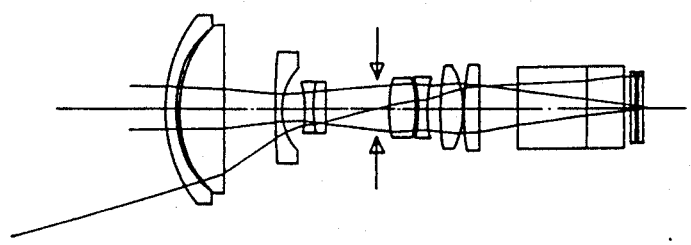
Figure 1C:
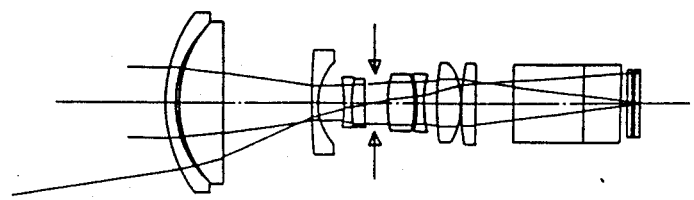

The Embodiment 1 is a zoom lens system having the composition illustrated in FIG. 1. Aberration characteristics at the wide position, intermediate focal length and tele position of the Embodiment 1 in a condition where it is focused on an object located at inifinite distances are visualized in FIG. 4, FIG. 5 and FIG. 6 respectively. Aberration characteristics at the tele position of the Embodiment 1 in a condition where it is focused on an object located at a distance of −1000 are illustrated in FIG. 7.

Figure 2A:
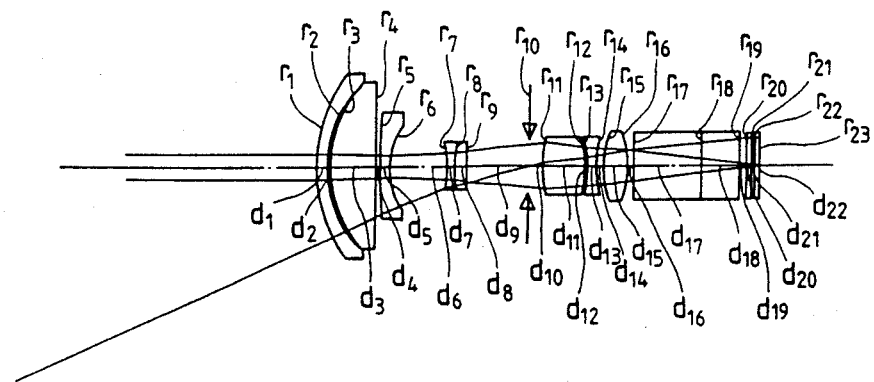
Figure 2B:
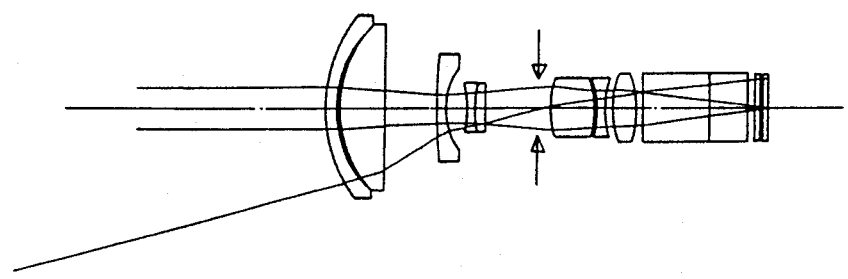
Figure 2C:
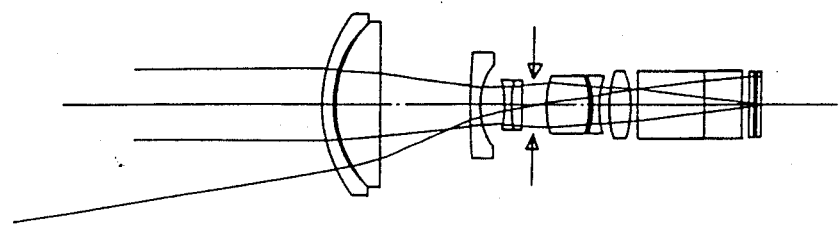

The Embodiment 2 in a zoom lens system having the composition illustrated in FIG. 2. In the Embodiment 2, the two positive lens elements arranged on the extremely image side in the Embodiment 1 are replaced with a single positive lens element and the image side surface ($r_{16}$) of this positive lens element is designed as an aspherical surface.

When the direction along the optical axis is taken as the x axis and the direction perpendicular to the optical axis is taken as the y axis, shape of this aspherical surface is expressed by the following formula:

$$x = Cy^2/(1 + \sqrt{1 - PC^2y^2}) + \sum_{i=1} A_{2i}y^{2i}$$

wherein the reference symbol p represents the conical constant, the reference symbol $A_{2i}$ designates the aspherical surface coefficient and the reference symbol C denotes curvature at the vertex of the aspherical surface.

Figure 8:
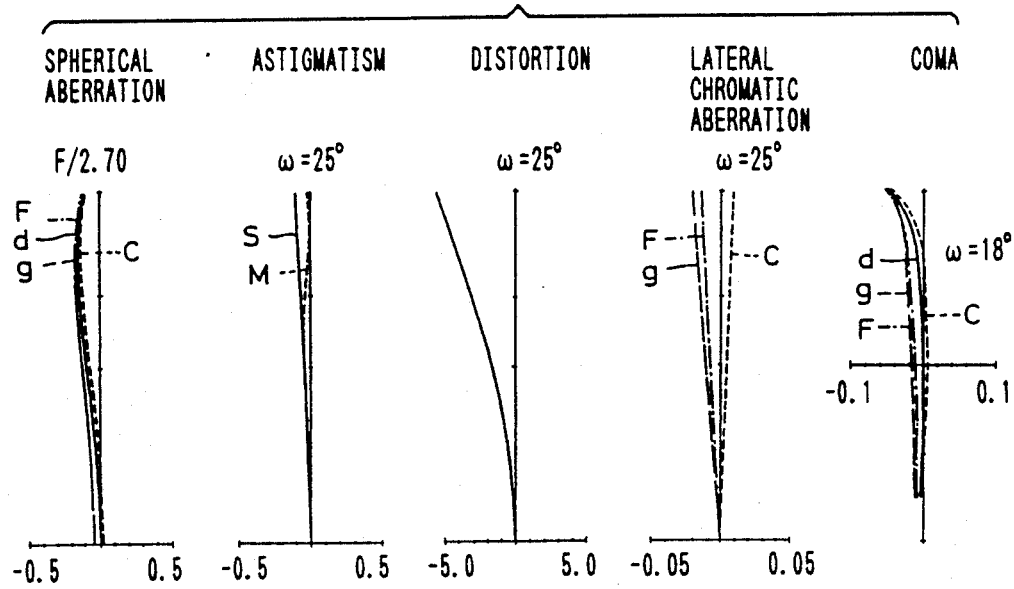
FIG. 8 through FIG. 11 show graphs illustrating aberration characteristics of the Embodiment 2 of the present invention.
Figure 9:
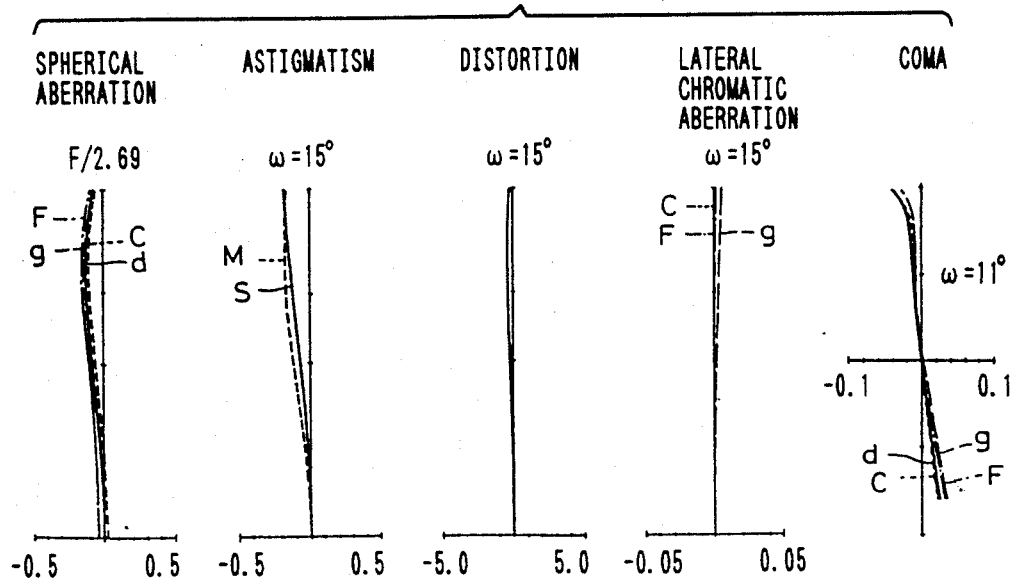
Figure 10:
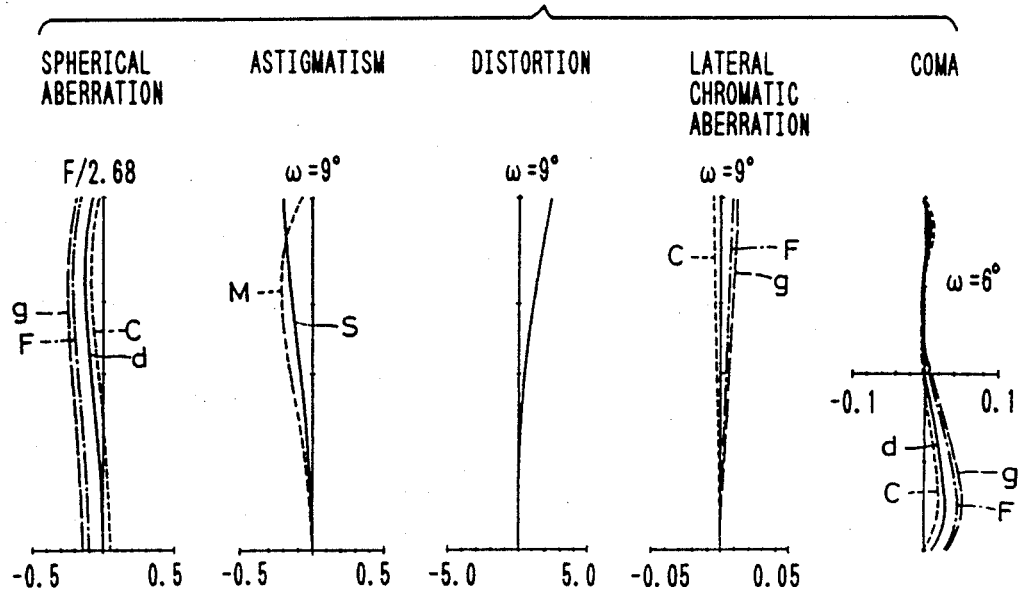
Figure 11:
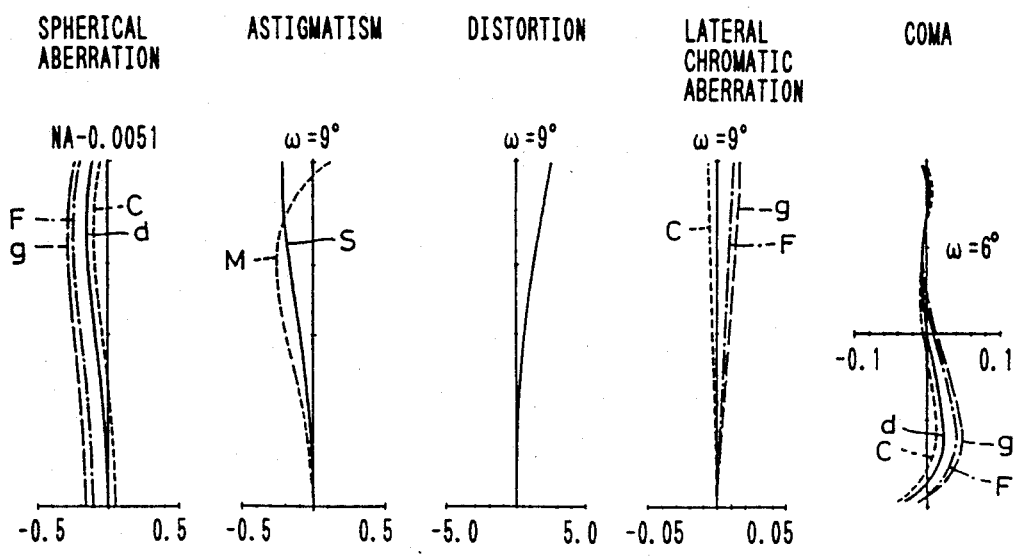

Aberration characteristics at the wide position, intermediate focal length and tele position of the Embodiment 2 in a condition where it is focused on an object located at infinite distance are visualized in FIG. 8, FIG. 9 and FIG. 10 respectively. Aberration characteristics at the tele position of the Embodiment 2 in a condition where it is focused on an object located at a distance of $-1000$ are shown in FIG. 11.

Figure 3A:
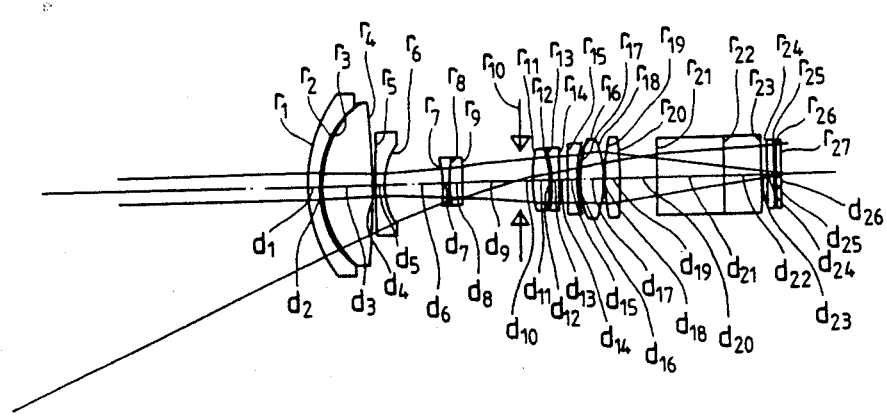
Figure 3B:
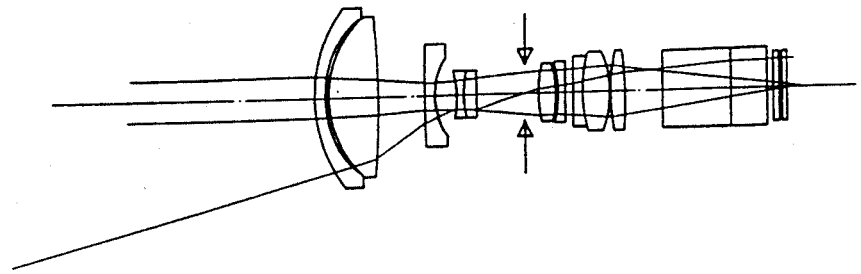
Figure 3C:
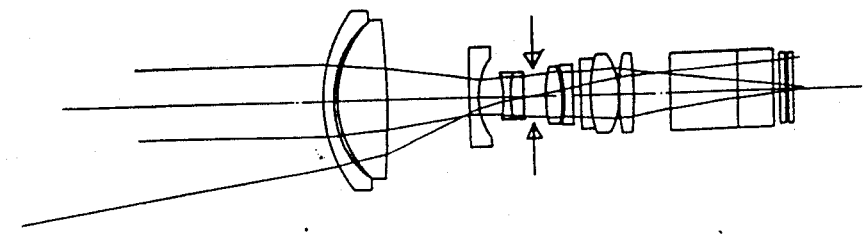
Figure 12:
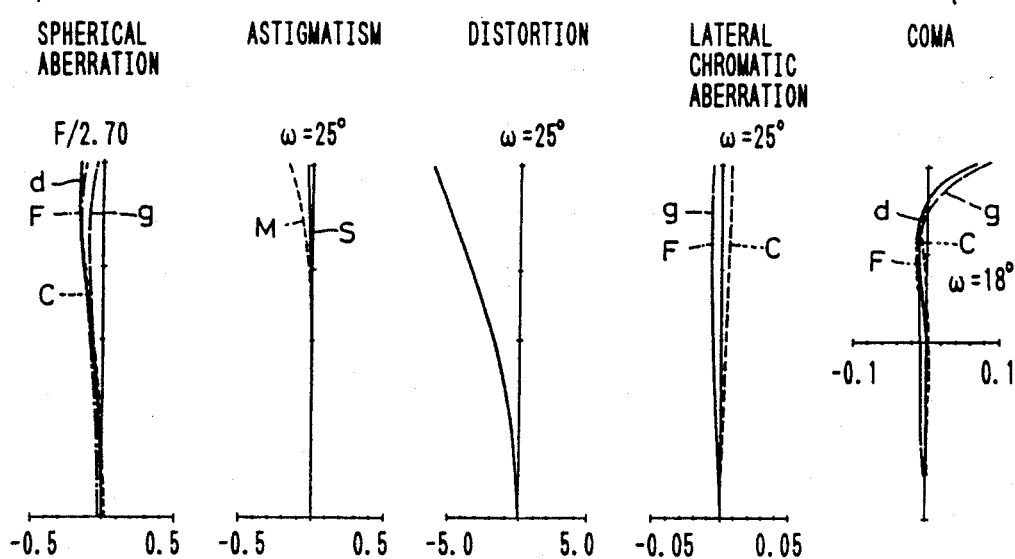
FIG. 12 through FIG. 15 show curves illustrating aberration characteristics of the Embodiment 3 of the present invention.
Figure 13:
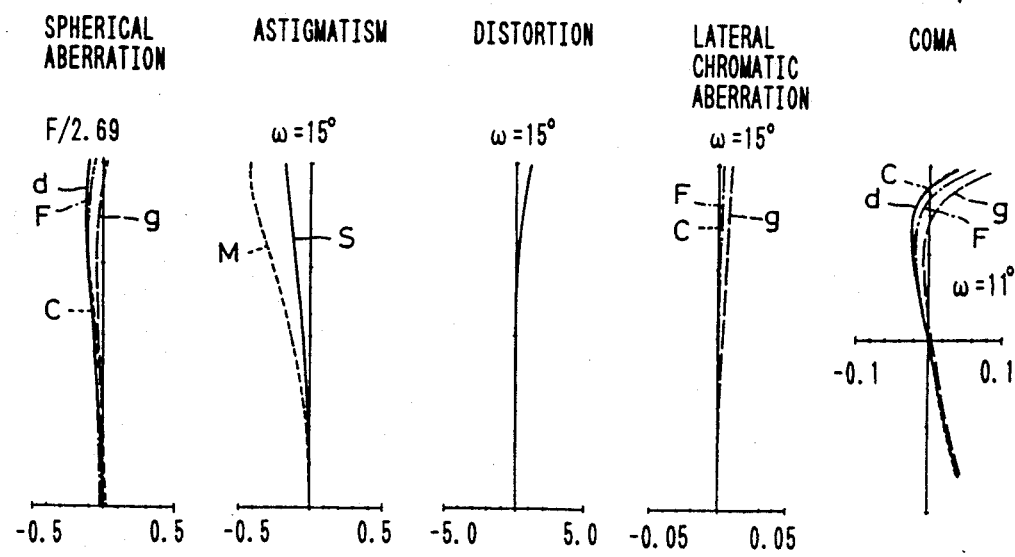
Figure 14:
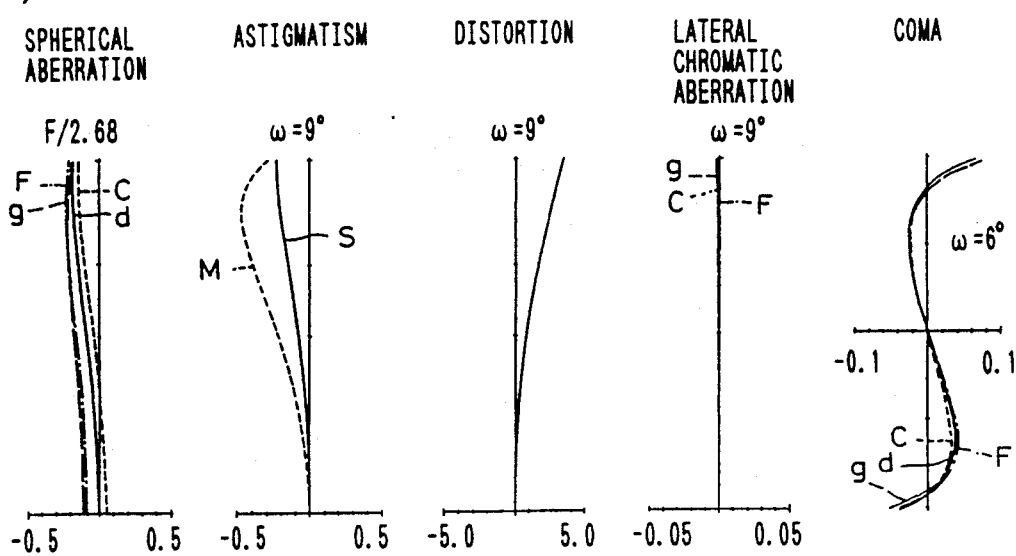
Figure 15:
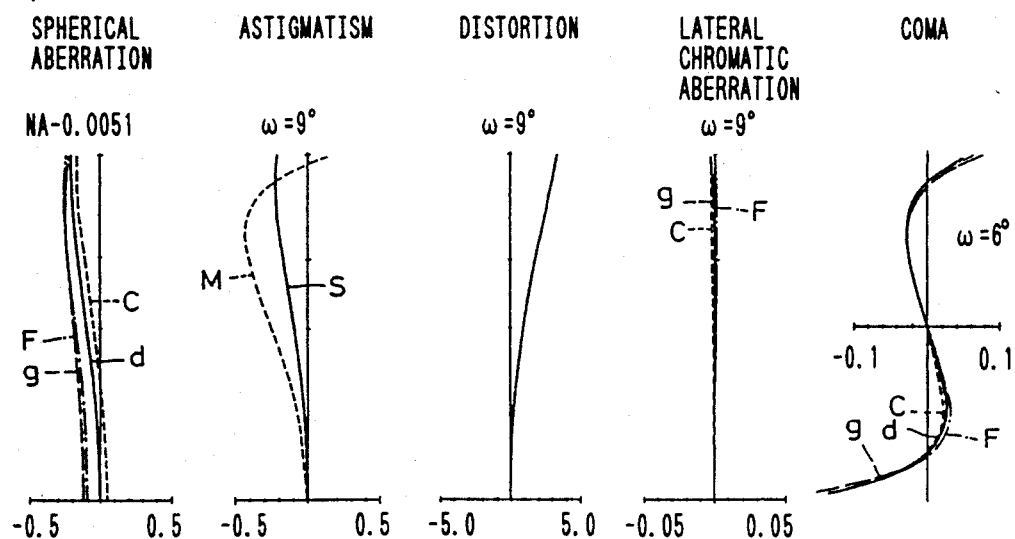

The Embodiment 3 is a zoom lens system having the composition illustrated in FIG. 3. Aberration characteristics at the wide position, intermediate focal length and tele position of the Embodiment 3 in a condition where it is focused on an object located at infinite distance are visualized in FIG. 12, FIG. 13 and FIG. 14 respectively. Further, aberration characteristics at the tele position of the Embodiment 3 in a condition where it is focused on an object located at a distance of $-1000$ are shown in FIG. 15.

As is understood from the foregoing description, the zoom lens system according to the present invention has a short total length, compact design, favorable imaging performance, a field angle of approximately 49° at the wide position, a vari-focal ratio of 3 and an aperture ratio on the order of F/2.8, and comprises lens elements in a number as small as 8 to 10 having diameters which are shortened, while reserving required quantity of the marginal ray, by composing the first lens unit which is apt to have a large diameter only of two lens elements.

I claim:

1. A zoom lens system comprising, in the order from the object side, a first lens unit having positive refractive power, a second lens unit having negative refractive power, and movable along the optical axis for varying focal length, a third lens unit having negative refractive power and movable along the optical axis for varying focal length but in a locus different from that of said second lens unit, and a fourth lens unit having positive refractive power and always kept fixed, said first lens unit consisting of a negative meniscus lens element having a convex surface on the object side and as positive lens element, said second lens unit consisting of a single negative meniscus lens element having a convex surface on the object side, said third lens unit consisting of a negative lens element and a positive lens element, and said zoom lens system being so designed as to satisfy the following conditions (1) and (2):

$$1.0 < (r_{21} + r_{22})/(r_{21} - r_{22}) < 2.5 \qquad (1)$$

$$f_W{}^{0.36} \cdot f_T{}^{0.64} < f_E < f_W{}^{0.1} \cdot f_T{}^{0.9} \qquad (2)$$

wherein the reference symbols $r_{21}$ and $r_{22}$ represent radii of curvature on the object side surface and the image side surface of the second lens unit, the reference symbol $f_E$ designates focal length of the zoom lens system as a whole when total magnification of the second lens unit and the third lens unit is set at 1, and the reference symbols $f_W$ and $f_T$ denote focal lengths of the zoom lens system as a whole at the wide position and tele position respectively thereof.

2. A zoom lens system according to claim 1 wherein said fourth lens unit consists, in the order from the object side, of the biconvex lens element having curvature higher on the object side surface thereof than that on the image side surface thereof, a biconcave lens element and two positive lens elements.

3. A zoom lens system according to claim 1 wherein said fourth lens unit consists, in the order from the object side, of a biconvex lens element having curvature higher on the object side surface thereof than that on the image side surface thereof, a biconcave lens element and a biconvex lens element.

4. A zoom lens system according to claim 1 wherein said fourth lens unit consists, in the order from the object side, of a biconvex lens element having curvature higher on the object side surface thereof than that on the image side surface thereof, two negative lens elements and two positive lens elements.

5. A zoom lens system according to claim 1, sastisfying the following conditions (6), (7) and (8):

$$|I_2| < 35°$$

$$I_2 = \sin^{-1}\{(\overline{EP}_T - d_1) \tan \omega_T/r_2\} - \omega_T \qquad (6)$$

$$0.9 < r_2/\sqrt{f_W \cdot f_T} < 2.0 \qquad (7)$$

$$0.35 < \Sigma D_1 \sqrt{f_W \cdot f_T} < 0.8 \qquad (8)$$

wherein the reference symbol $\omega T$ represents the maximum half angle when the zoom lens system is focused on an object located at infinite distance, the reference symbol $\overline{EP}_T$ designates distance as measured from the first surface of the zoom lens system to the entrance pupil thereof when the zoom lens system is focused on an object located at infinite distance, the reference symbol $d_1$ denotes thickness of the negative meniscus lens element arranged in the first lens unit, the reference symbol $r_2$ represents radius of curvature on the image side surface of said negative meniscus lens element and the reference symbol $\Sigma D_1$ designates distance as measured from the extremely object side surface of the first lens unit to the extremely image side surface thereof.

6. A zoom lens system according to claim 1 or 5 sastisfying the following condition:

$$v_{I-2} - v_{I-1} > 20$$

wherein the reference symbols $V_{I-1}$ and $V_{I-2}$ represent Abbe's numbers of the negative meniscus lens element and the positive lens element respectively arranged in the first lens unit.

7. A zoom lens system according to claim 1 or 5 satisfying the following condition:

$$n_{I-2} > 1.6$$

wherein the reference symbol $n_{I-2}$ represents refractive index of the positive lens element arranged in the first lens unit.

8. A zoom lens system according to claim 1 or 5 satisfying the following condition:

$$0.25 < f_I/|f_{I-1}| < 0.7$$

wherein the reference symbol $f_I$ represents focal length of the first lens unit and the reference symbol $f_{I-1}$ designates focal length of the negative meniscus lens element arranged in the first lens unit.

* * * * *